March 8, 1932. J. RAUS 1,848,544
ART OF MANUFACTURING ARTICLES MADE OF GLASS AND METAL
Filed May 31, 1928
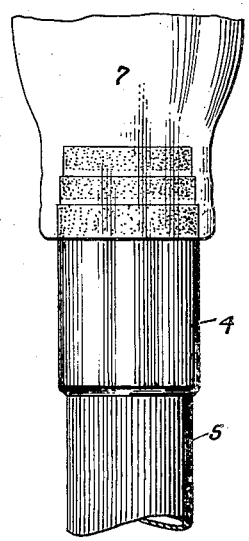
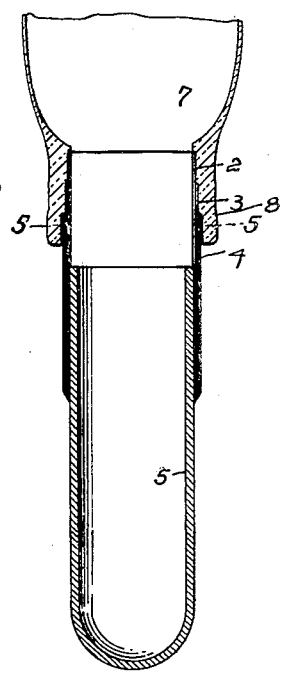
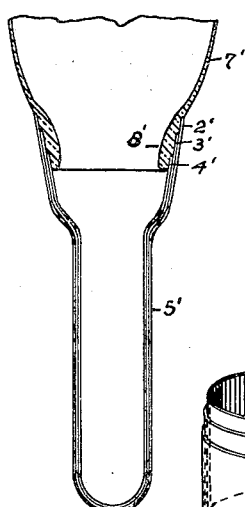
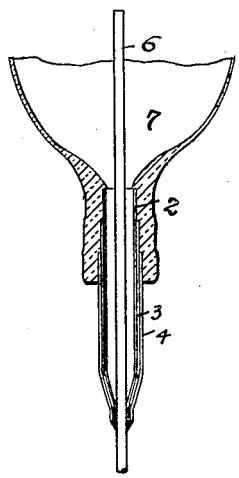
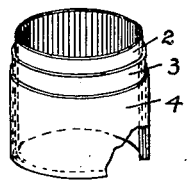
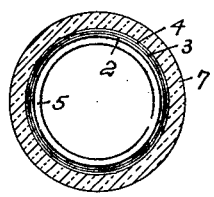
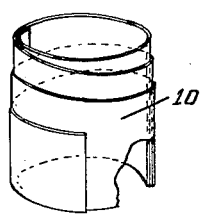
Inventor
JOHN RAUS
By Fisher, Moser & Moore
Attorney Patented Mar. 8, 1932

1,848,544

UNITED STATES PATENT OFFICE

JOHN RAUS, OF CLEVELAND, OHIO, ASSIGNOR TO THE CLEVELAND A. C. TUBE MANUFACTURING COMPANY, OF CLEVELAND, OHIO, A CORPORATION OF OHIO

ART OF MANUFACTURING ARTICLES MADE OF GLASS AND METAL

Application filed May 31, 1928. Serial No. 281,643.

The present invention relates to the art of manufacturing articles made and combined of glass and metal, particularly evacuated glass and metal tubes which require hermetically-sealed joints. Thus, the object of the invention in general is to produce, in a simple and facile way, a permanent hermetically-sealed connection between a glass tube and a metal tube. The inventive concept involves, first, the joining of a glass tube with two or more metal tubes which are loosely sleeved together, and second the production of a series of separate sealing zones between the glass tube and the sleeved metal tubes. One object in sleeving two or more metal tubes together is to permit relatively thin metal to be employed, thereby permitting the welding of glass to the metal without separation or fracture when cooling takes place, and furthermore, a strong durable support and connection may be made for a glass tube by sleeving two or more thin tubes within each other to stiffen and reenforce each other. The purpose of sealing the glass in separate zones is to provide ample security for hermetical sealing of the parts and in addition, to increase the strength and stability of the joint.

In the accompanying drawings, Fig. 1 is a side elevation of a portion of the evacuated tube embodying my invention, and Fig. 2 a sectional view thereof. Fig. 3 is a sectional view of a modification. Fig. 4 is a perspective view of a sleeved metal tube. Fig. 5 is a cross sectional view on line 5—5 of Fig. 2. Fig. 6 is a perspective view of the spirally formed metal tube, and Fig. 7 is a further modification.

In manufacturing evacuated glass tubes or similar hollow bodies in which a metal electrode or other metal element is welded and hermetically sealed to the glass it is well known that such welding and sealing may be effected providing the body or sheet of metal is thin enough so that the expansion of the different materials is approximately co-equal or such that fracture or leakage will not result when the heated areas cool off and contract.

Thus the metal piece or part may be three to fifteen thousandths of an inch in thickness to effect a hermetical seal and union with glass of proper composition all as known to those skilled in the art. It was also a former practice to use thin sheets or tubes of platinum for such purposes, but owing to the cost and expense of platinum, copper is now used extensively in lieu thereof. However a copper sheet or tube of five to fifteen thousandths of an inch in thickness does not in itself possess sufficient rigidity and strength to serve every desired purpose. For example, in making an X-ray or power tube, or any other articles in which a metal part is sealed to a glass wall, it is customary to utilize the metal part as a support for the complete article, or to support other elements internally of the tube or vessel. The metal part must therefore be of ample thickness and strength or constructed otherwise to meet such requirements. In general a single metal tube as thin as described is not adequate or satisfactory as a support for the article. Therefore to provide a rigid support, and to gain other advantages I sleeve or telescope two or more very thin metal tubes of slightly different diameters either loosely or tightly together, using tubing preferably of three to fifteen thousandths of an inch in thickness and sleeving the tubes so that the corresponding ends thereof extend beyond one another a predetermined distance, say one-fourth of an inch. Thus, as delineated in the drawings, three thin metal tubes 2, 3, and 4, respectively, of unequal length and different diameters, are telescoped together with the inner tube 2 projecting beyond the end of the second tube 3, which in turn is extended beyond the end of outer tube 4. The overlapping portions are not united to each other when sleeved together at the beginning of operations but the opposite ends of the same tubes may be united together by brazing or any other suitable way, and also united to another metal part. For example either a tubular or solid member may be brazed or united to the inner tube 2, either before or after the sealing connection is made with a glass bulb, shell or tube 7. To illustrate, in Fig. 2 I show a hollow cylinder 5 extending into and brazed to the lower end of a thin copper tube 2, and in Fig. 3 I show a solid rod or wire 6 brazed to the reduced outer ends of the sleeved tubes 2, 3, and 4, respectively. Cylinder 5 may be made of nickel or any other metal, and in one type of electrical power tube it is used as a supporting element and electrode. In Fig. 3, the solid rod or wire 6 represents either an electrical conductor or electrode, or a support for other parts which may be used internally of the glass bulb or shell 7. In either case the thin walls of the copper tubes are free to expand and contract in respect to each other where the ends are extended and where overlapped or laminated, to permit a plural number of sealing connections or joints to be made with the neck 8 of the glass tube or shell 7.

Thus, in producing the article the protruding ends of the telescoped copper tubes are inserted within or sleeved over a glass tube, or the neck of a hollow glass body, and the glass heated to a molten condition opposite the successive extensions. When the glass is ductile and workable, it is shaped or formed as commonly to fit and unite with the end of each thin copper tube 2, 3, and 4, respectively. The operation obviously involves only an annular part of each metal tube, and as this annular part is relatively thin and of uniform thickness throughout each metal tube may expand and contract uniformly or equally at all points where contact or connection is made with the glass. In that way a hermetically sealed connection is made with the glass in several zones; or in other words, a series of annular sealing zones are produced at spaced intervals successively at the neck or juncture with the glass tube or shell. Each tube is thus united to the glass independently of the other tubes although as all of the tubes are telescoped together they combine or operate together to give a high degree of rigidity and strength to the connection.

In sealing several telescoped metal tubes to a glass tube as described the separate sealing zones are parallelly related, and this is the preferred arrangement.

However, in Fig. 6 I show a metal tube 10 which possesses considerable rigidity although made of thin stock. In the modified form of the invention a thin ribbon of metal is coiled upon itself and so formed that edge portions thereof overlap each other spirally to provide a succession of thin walls at one end of the tube, whereby hermetical sealing of the metal tube and glass may be effected over extended areas without fracture or breakage. The main body of this spirally wound tube, and the main body of a tube made of several thin tubes telescoped together, are similar in that each wall thereof is composed of a series of thin laminations which considered individually permit a good sealing connection to be made with glass and which considered as a whole or in combination, give rigidity and strength to the structure.

In Fig. 7 I show a modification of the invention, consisting of three thin shells or drawn tubes sleeved or telescoped within each other, the bottom ends of the tubes being closed, and the upper ends being enlarged and of tapering or flaring form. In this form of the invention the outer tube 2' is the longest tube, the second or middle tube 3' is slightly shorter than the outer tube, and the inner tube 4' is still shorter, thus producing a series of overlapping extensions in substantially the same way as hereinbefore described.

The glass shell or tube 7', in this instance, is welded to the inside flaring overlapping ends of the sleeve tubes, and the reduced extension 5' of the tubes is sealed as cupped and nested and as shown in Fig. 7.

What I claim, is:

1. The method of uniting glass and metal tubes, which consists in welding a glass tube in adjacent zones to a plural number of thin metal tubes sleeved together in overlapping relationship, and sealing the interspaces between said metal tubes.

2. The method of uniting glass and metal tubes which consists in sleeving thin metal tubes snugly together, welding a glass tube with hermetical sealing effect to each of said metal tubes, and uniting one of said tubes to a supporting element.

3. A hollow glass body, and a plurality of thin metal tubes sleeved together in overlapping relationship, the corresponding ends of all said metal tubes being welded annularly to the glass.

4. A hollow glass body and a plural number of thin metal tubes sleeved together, the corresponding ends of the metal tubes being extended successively beyond each other and welded independently to the glass.

5. A hollow glass body, a plurality of thin metal tubes sleeved together in extended relation and welded in separate zones to the glass, and a member extending into said metal tubes and united thereto.

In testimony whereof I affix my signature.

JOHN RAUS.